US012555446B2

(12) United States Patent
Palmer et al.

(10) Patent No.: US 12,555,446 B2
(45) Date of Patent: Feb. 17, 2026

(54) AUDIBLE INDICATOR FOR ACCESS CONTROL SYSTEMS

(71) Applicant: Schlage Lock Company LLC, Carmel, IN (US)

(72) Inventors: Phillip Palmer, Indianapolis, IN (US); John D. Stalter, Indianapolis, IN (US); Naveena Balenahalli Nagaraju, Ramanagara District (IN); Jack R. Lehner, Jr., Indianapolis, IN (US); Rockwood T. Roberts, III, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 185 days.

(21) Appl. No.: 18/240,746

(22) Filed: Aug. 31, 2023

(65) Prior Publication Data

US 2025/0078633 A1 Mar. 6, 2025

(51) Int. Cl.
*G08B 3/10* (2006.01)
*H04R 1/02* (2006.01)

(52) U.S. Cl.
CPC ............... *G08B 3/10* (2013.01); *H04R 1/028* (2013.01)

(58) Field of Classification Search
CPC .......... G08B 3/10; H04R 1/028; G10K 15/00; G10K 15/02; G10K 15/04
See application file for complete search history.

(56) References Cited

U.S. PATENT DOCUMENTS 4,763,111 A 8/1988 Matsuo et al.
2002/0021205 A1 2/2002 Schweitzer
2008/0258911 A1* 10/2008 Gray ...................... G08B 13/08 340/693.5
2009/0195383 A1 8/2009 Hsu
2017/0032634 A1 2/2017 Hendrie
2020/0011093 A1* 1/2020 Ullrich .................. E05B 1/0007

FOREIGN PATENT DOCUMENTS

ES 2208085 B1 6/2004
GB 2280802 A 2/1995

OTHER PUBLICATIONS

International Search Report; ISA/US; International Application No. PCT/US2024/045014; Mar. 12, 2025; 4 pages.
Written Opinion of the International Searching Authority; ISA/US; International Application No. PCT/US2024/045014; Mar. 12, 2025; 10 pages.

* cited by examiner

*Primary Examiner* — Sisay Yacob
(74) *Attorney, Agent, or Firm* — Taft Stettinius & Hollister LLP

(57) ABSTRACT

A motor assembly is provided that includes an audible indicator for an access control device for a door, such as an exit device or an auto-operator. The audible indicator is configured to provide an audible output in response to a signal that initiates operation of the motor to change a state of a latch or open the door.

20 Claims, 11 Drawing Sheets

AUDIBLE INDICATOR FOR ACCESS CONTROL SYSTEMS

TECHNICAL FIELD

The present disclosure generally relates to access control systems, and more particularly but not exclusively relates an audible indicator for an access control system.

BACKGROUND

Access control systems, such as exit devices and auto-operators, can include motor or solenoid-driven mechanisms that can hold the device in an undogged, unlatched, and/or unsecured state to permit opening of the door. Such devices typically return to a dogged, latched, or secured state when electrical power is removed from the electromechanical driver. The transitions between the undogged/unlatched state/unsecured and the dogged/latched/secured states can be managed by an electronic access control system, which can rely on credentials, sensors, and/or on schedules to determine when to change states.

Certain exit devices can operate with quiet latch retraction (QEL) in areas or facilities in which noise associated with the motor and movement of mechanical components is undesirable, such as in hospitals, educational facilities, or other settings. QEL exit devices can employ stepper motors that give off limited operational noise while providing electronic control of the exit device. One issue that has arisen with QEL exit devices is that they may be too quiet for certain applications. For example, the user may not be able to ascertain that the latch is unsecured without pushing on the door. If the latch is in a secure state, this can result in delays and unnecessary or undesirable user interactions with the door.

As should be evident from the foregoing, certain conventional access control mechanisms suffer from a number of drawbacks and deficiencies. For these reasons among others, there remains a need for further improvements in this technological field.

SUMMARY

An exemplary access control device includes a motor assembly for an exit device or an auto-operator for a door. The motor assembly includes a motor operably engaged to an actuator that actuates the exit device or the auto-operator, a controller that is configured to initiate operation of the motor in response to an input signal, and an audible indicator including a housing, a circuit board mounted to the housing, and a speaker mounted to the circuit board. The circuit board is electrically connected to input power and to the controller, the housing is fastened to the motor with the controller between the audible indicator and the motor, and the speaker is operable to generate an audible output in response to the input signal initiating operation of the motor.

An exemplary audible indicator includes a housing and circuit board mounted on the housing. The housing includes a base, a first leg extending from a first end of the base, and a second leg extending from a second end of the base. In an embodiment, the first and second legs and the base form a U-shaped cavity, but other configurations are possible in other embodiments. The circuit board is mounted to the base in the cavity and includes a first side and an opposite second side. The first side of the circuit board includes a speaker, an input terminal, and an output terminal connected to the circuit board. The second side of the circuit board includes a number of electrical components connected to the circuit board. The number of components are configured to provide a drive circuit to initiate an audible output from the speaker in response to a signal to the exit device or the auto-operator indicating unlatching or opening of the door.

Further embodiments, forms, features, and aspects of the present application shall become apparent from the description and figures provided herewith.

DETAILED DESCRIPTION OF ILLUSTRATIVE EMBODIMENTS

Figure 1:
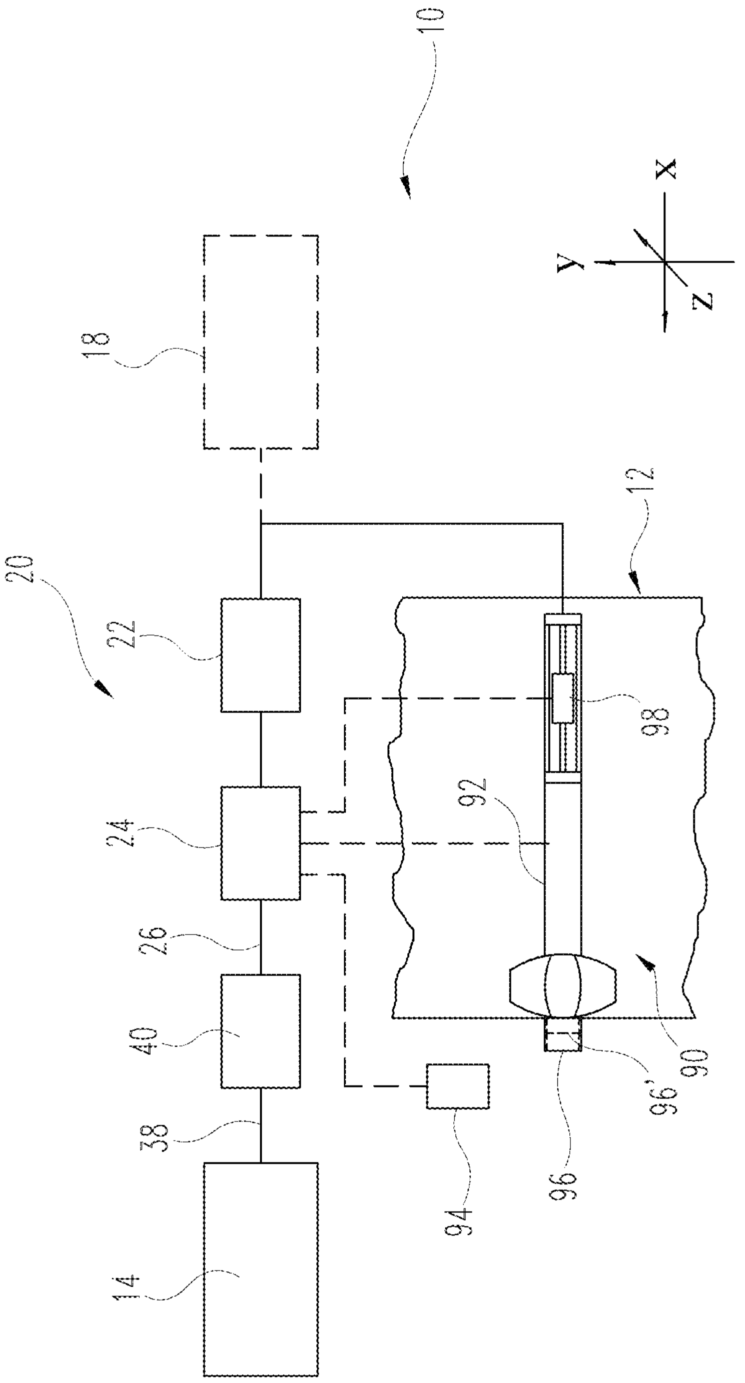
FIG. 1 is a schematic diagram of an access control system according to certain embodiments of the present disclosure.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. The directions defined by each axis may be referred to as positive and negative directions, wherein the arrow of the axis indicates the positive direction. In the coordinate system illustrated in FIG. 1 the X-axis defines first and second longitudinal directions (horizontal in the FIG. 1 orientation), the Y-axis defines first and second lateral directions (vertical in the FIG. 1 orientation), and the Z-axis defines first and second transverse directions (into and out of the page in the FIG. 1 orientation.)

Additionally, the descriptions that follow may refer to the directions defined by the axes with specific reference to the orientations illustrated in the Figures. For example, the longitudinal directions may be referred to as "distal" ($X^+$) and "proximal" ($X^-$). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, there is shown an access control system 10 for a door 12. Access control system 10 includes an exit device 90, a motor assembly 20, and a power supply 14. Power supply 14 may be provided by line power and/or by an energy storage device, such as a battery. Motor assembly 20 includes an electrically powered motor 22, a controller 24, and an audible indicator 40. In an embodiment, access control system 10 includes an auto-operator 18, in lieu of or in addition to exit device 90. Auto-operator 18 may be configured to automatically open, or assist opening, of door 12 in response to an input signal to motor 22.

Motor 22 is controlled by controller 24 to unsecure a latch 96 of exit device 90 and/or operate auto-operator 18 based on a signal provided to controller 24. The signal to unsecure latch 96 and/or operate auto-operator 18 can be generated in response to, for example, a user pushing or actuating push-bar assembly 92 and/or actuation of auto-operator 18, in response to presentation of credentials to credential reader 94, in response to an input from a sensor 98 indicating a user presence, and/or in response to a schedule programmed in controller 24.

The audible indicator 40 outputs an audible signal in response to the signal provided to controller 24 to unsecure latch 96 and/or operate auto-operator 18. In the illustrated embodiment, audible indicator 40 is connected between power supply 14 and controller 24. The audible indicator 40 is powered constantly by the same power supply that powers motor 22. Audible indicator 40 therefor receives a signal to activate in response to the same signal that actuates motor 22 to unsecure latch 96 and/or operate auto-operator 18. As a result, the audible indicator 40 acts in unison with motor 22 to output an audible signal that motor 22 is operating to unsecure latch 96 and/or operate auto-operator 18.

In an embodiment, exit device system 10 includes a swinging door 12 and exit device 90 mounted to the door 12. The door 12 is mounted to a doorframe (not shown) for swinging movement between an open position (not shown) and a closed position (shown), and the latch 96 of exit device 90 and/or auto-operator 18 are configured to selectively retain the door 12 in the closed position. The auto-operator 18 and/or exit device 90 have a plurality of states or conditions, including a secured condition, an unsecured condition, and an open condition.

For example, in the secured condition the door 12 is in its closed position, the exit device 90 and/or auto-operator 18 is in a deactuated state, and the latch 96 of exit device 90 engages the doorframe and retains the door 12 in its closed position. Actuation of the exit device 90 and/or auto-operator 18 causes the latch 96 to transition to the unsecured condition, in which the door 12 is capable of being moved from its closed position to its open position under push/pull operation of the user or by operation of auto-operator 18.

In an embodiment, the audible output from audible indicator 40 is controllable in duration so that the audible output is provided only at a start of actuation of motor 22 to unsecure latch 96, for a time period that is less than the duration of actuation of motor 22, or for a time period that corresponds to the period in which the motor 22 is operating. In an embodiment, the audible output from audible indicator 40 is initiated after a delay from the start of motor 22 to place latch 96 in an unsecure state.

In an embodiment, the audible output from audible indicator 40 is a tone, a buzzer, a beep, or other sound. The audible output from audible indicator 40 can be provided in multiple tones, buzzes, or beeps, or in a single tone, buzz, or beep. In an embodiment, the audible output from audible indicator is selectable from a plurality of sounds programmed into memory of audible indicator 40 or controller 24.

In an embodiment, the output from audible indicator 40 is a distinct sound or tone that is customizable to provide additional information to the user, such as a type of exit device 90 being used and/or a source identifier for the exit device 90, such as the manufacturer, supplier, etc. In an embodiment, the output from audible indicator 40 is a distinct sound or tone that is customizable to indicate a type of room or location being entered or accessed through the door 12, e.g. a secure area, sterile area, clean room, etc.

Figure 2:
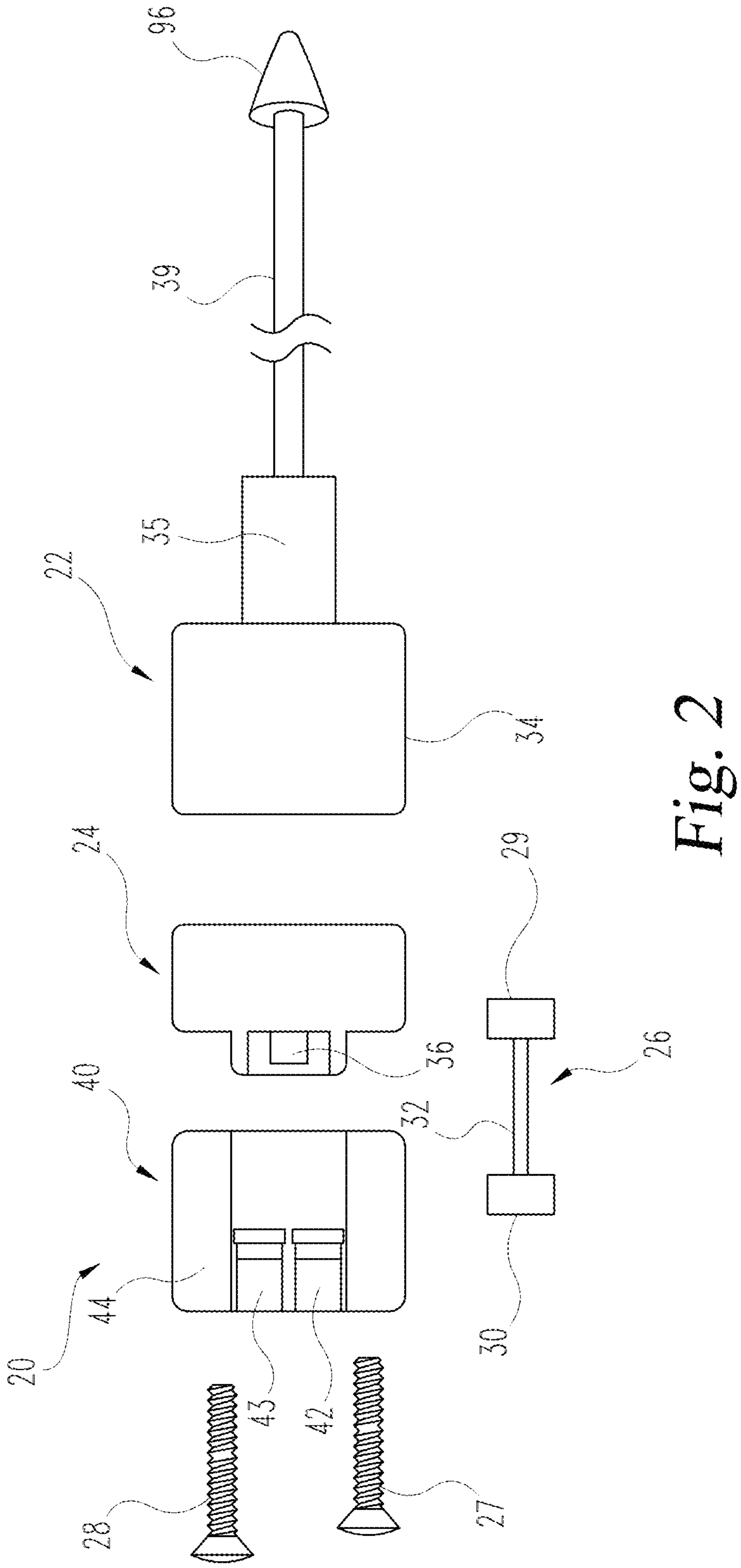
FIG. 2 is an exploded schematic view of motor assembly for the access control system of FIG. 1.

With reference to FIG. 2, an exploded schematic view of motor assembly 20 is provided. Motor assembly 20 includes motor 22, controller 24, and audible indicator 40. Audible indicator 40 is engaged to motor 22 with first and second assembly fasteners 27, 28 that extend through audible indicator 40 and controller 24 and into engagement with a casing 34 of motor 22. An electrical connector 26 is provided with end connectors 29, 30 and wiring 32 connecting end connectors 29, 30. Motor 22 includes an output shaft or member 35 that is connected to a shaft assembly or actuator that is operable to secure and unsecure latch 96

In an embodiment, motor 22 is a stepper motor. In an embodiment, controller 24 sends a series of electrical pulses or steps to the motor 22 to control the linear motion of the motor shaft or actuator 39. The number of pulses sent by the controller 24 controls the distance that the motor shaft or actuator 39 is displaced. In other embodiments, the linear motion may be provided in another manner. For example, certain embodiments may include a rack and pinion linear actuator, a geared design using chains or belts, a linear motor actuator, or other types of motion control systems. Such alternatives may also be designed with or without stepping motors.

Figure 3:
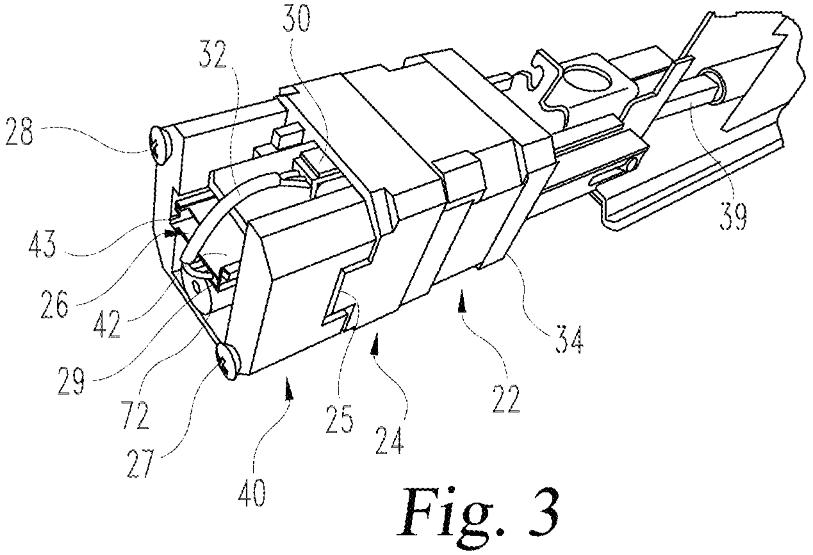
FIG. 3 is an example embodiment of the motor assembly of FIG. 2.

With further reference to FIG. 3, one of the end connectors 29, 30 of electrical connector 26 is electrically connected to an output connector or terminal 42 of audible indicator 40, and the other end connector 29, 30 is electrically connected to an input terminal 36 of controller 24. A second electrical connector 38 (FIG. 1) electrically connects output connector or terminal 43 of audible indicator 40 to power supply 14.

The audible indicator 40 is connected in abutting contact with controller 24, and controller 24 is clamped or secured between audible indicator 40 and motor 22 in abutting contact with each of audible indicator 40 and motor 22. Motor 22 includes an output 35 that is mechanically connected to actuator 39, such as a shaft assembly or other device that actuates latch 96 during operation of motor 22 between a secure state or position and an unsecure state or position, as indicated by 96' in FIG. 1. In the unsecure state or position, latch 96 is allowed to retract, or is retracted, to allow door 12 to open.

Figure 4:
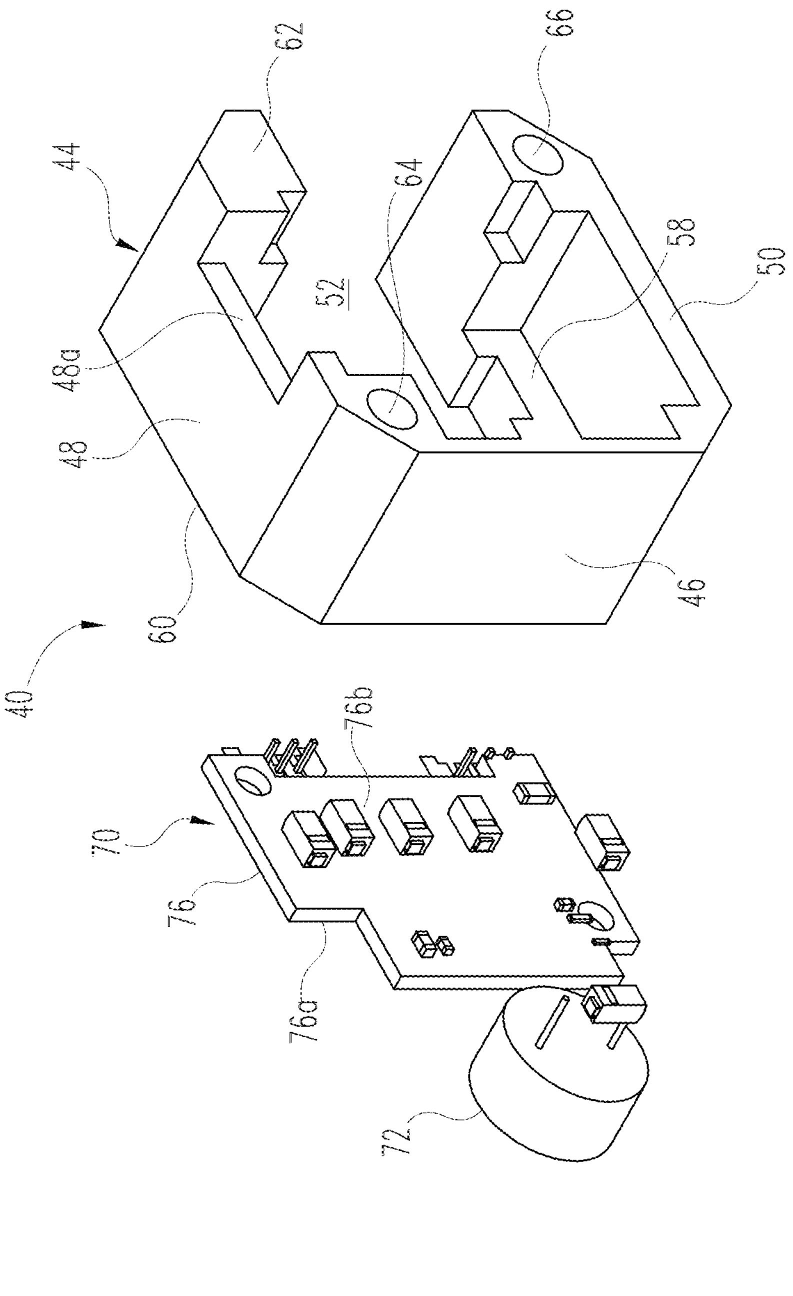
FIG. 4 is an exploded perspective view of an embodiment of an audible indicator of the motor assembly of FIG. 2.
Figure 5:
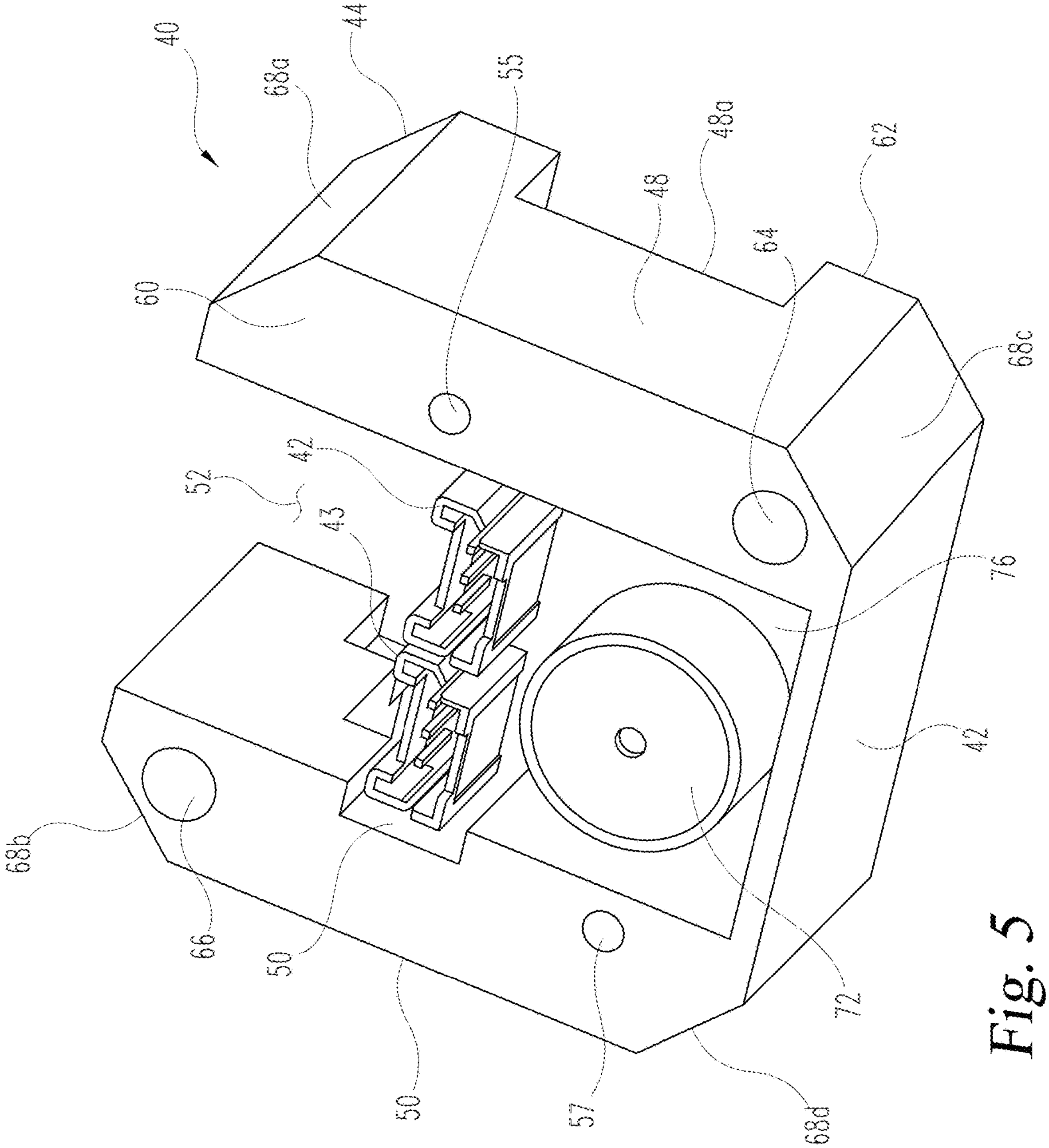
FIG. 5 is a perspective view of the audible indicator of FIG. 4.
Figure 6:
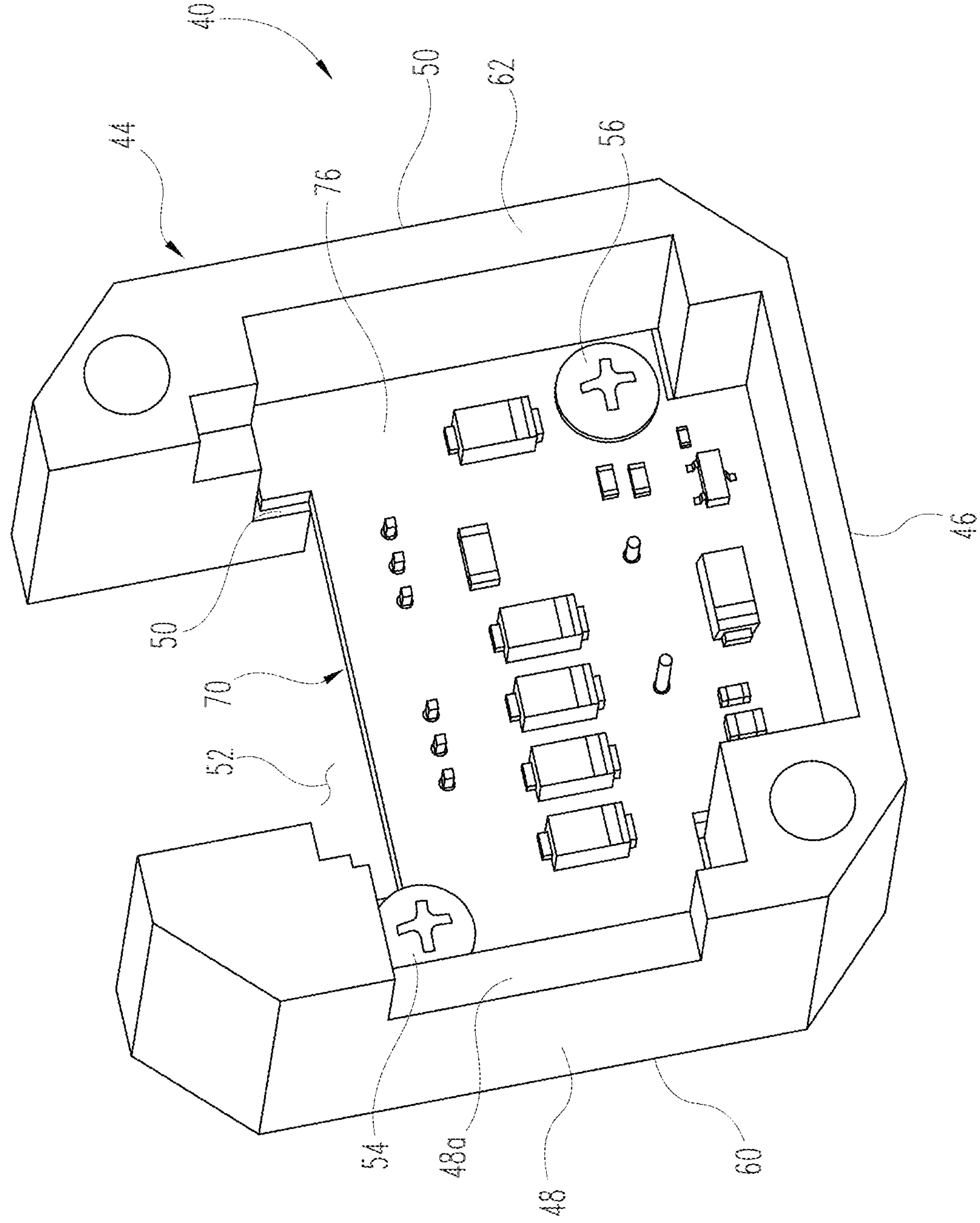
FIG. 6 is another perspective view of the audible indicator of FIG. 4.

With references to FIGS. 4-6, an embodiment of audible indicator 40 is shown. Audible indicator 40 includes a housing 44 and a circuit board 70 mounted housing 44. Housing 44 includes a general U-shape configuration with a base 46 and first and second legs 48, 50 extending outwardly from a first side of base 46 to form a cavity 52. In an embodiment, base 46 and legs 48, 50 form a U-shaped lip 58 against which circuit board 70 is positioned. Other embodiments contemplate other shapes and configurations for base 46.

Circuit board 70 is positioned in cavity 52 and supported on lip 58. Circuit board 70 is engaged to leg first 48 with first fastener 54 in first fastener bore 55. First fastener bore 55 is located adjacent to an outer end of first leg 48 opposite base 46. Circuit board 70 is also engaged to second leg 50 with second fastener 56 extending through second fastener bore 57 in leg 50. Second fastener bore 55 is located adjacent to base 46.

Housing 44 includes an outer facing side 60 and an opposite controller facing side 62 that faces controller 24. Lip 58 faces toward controller facing side 62. Speaker 72 is oriented toward the outer facing side 60. Speaker 72 is also contained within housing 44 so that it does not project beyond outer facing side 60. The flush or recessed configuration of speaker 72 relative to housing 44 protects speaker 72 from impact or damage, while providing an opening in housing 44 through which the audible output can be provided.

A third fastener bore 64 is provide at the junction of first leg 48 and base 46. A fourth fastener bore 66 is provided at the adjacent the outer end of second leg 50. Third and fourth fastener bores 64, 66 extend through housing 44 and open at each of outer facing side 60 and controller facing side 62. Assembly fasteners 27, 28 extend through respective ones of the third and fourth fastener bores 64, 66, through controller 24, and into aligned bores in motor casing 34 to couple housing 44 to motor casing 34 with controller 24 clamped therebetween.

Housing 44 includes an outer perimeter surface 68 that extends around housing 44 and also extends between sides 60, 62. Perimeter surface 68 includes beveled corners **68*a*, 68*b* at the outer ends of first and second legs 48, 50. Perimeter surface 68 also includes beveled corners 68*c*, 68*d* at the junction of legs 48, 50 with base 46. A gap or opening in perimeter surface 68 between the outer ends of legs 48, 50 provides access to cavity 52 between legs 48, 50. In addition, the gap or opening provides space for connection of electrical connector 26 to controller 24**.

First leg 48 includes a first cutout **48*a* on the controller facing side 60. Cutout 48*a* receives a protrusion 25 extending from a body of controller 40 to facilitate abutting engagement between indicator device 40 and controller 24, and provide a secure, rotation-resistant assembly of audible indicator 40 on controller 24. Second leg 50 includes a second cutout 50*a* in an inner facing side of second leg 50 that faces cavity 52. Second cutout 50*a* forms a notch that receives a portion of the input terminal 43 extending from circuit board 70 adjacent to output terminal 42. Input terminal 43 can be connected to the power supply 14 with second electrical connector 38**.

Figure 7:
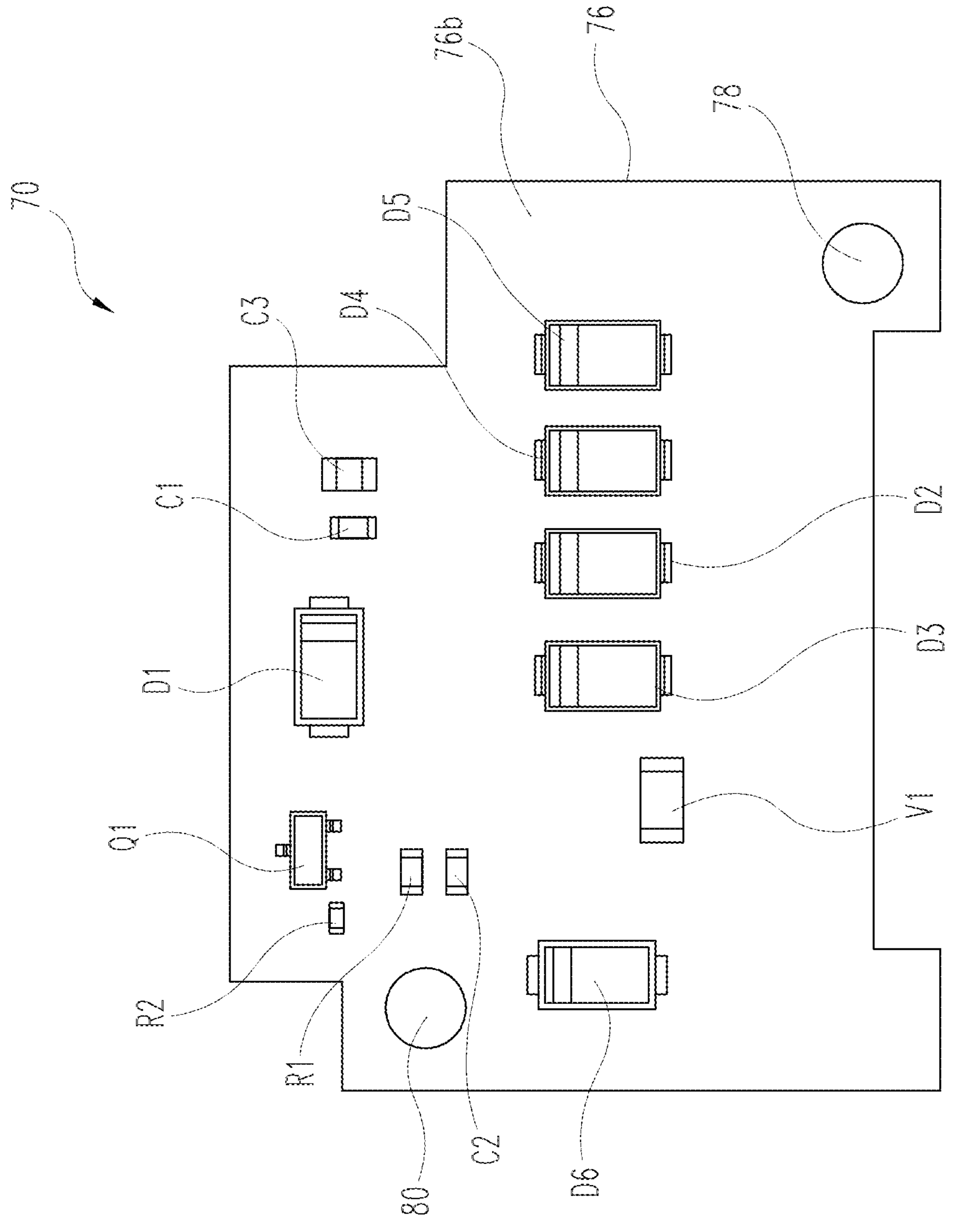
FIG. 7 is a top side plan view of a circuit board of the audible indicator of FIG. 4 according to certain embodiments.
Figure 8:
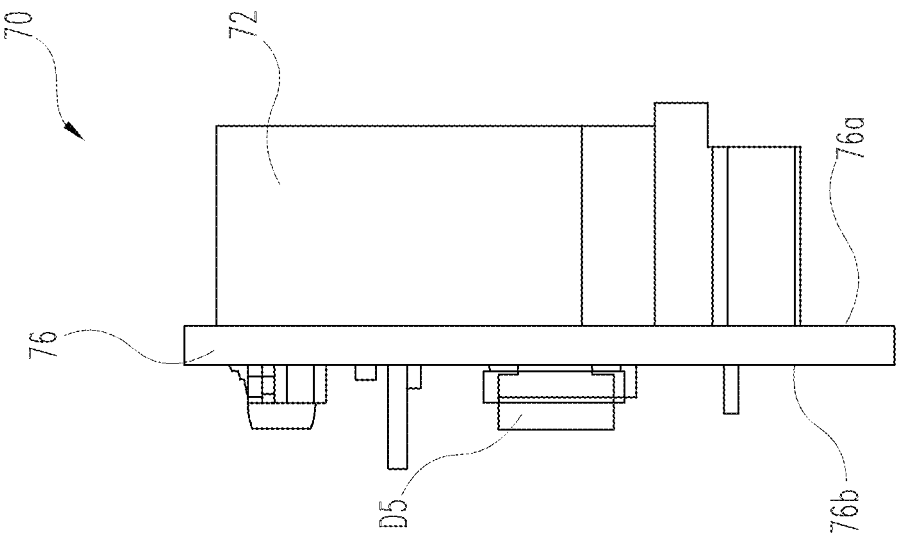
FIG. 8 is a right side elevation view of the circuit board of FIG. 7.
Figure 9:
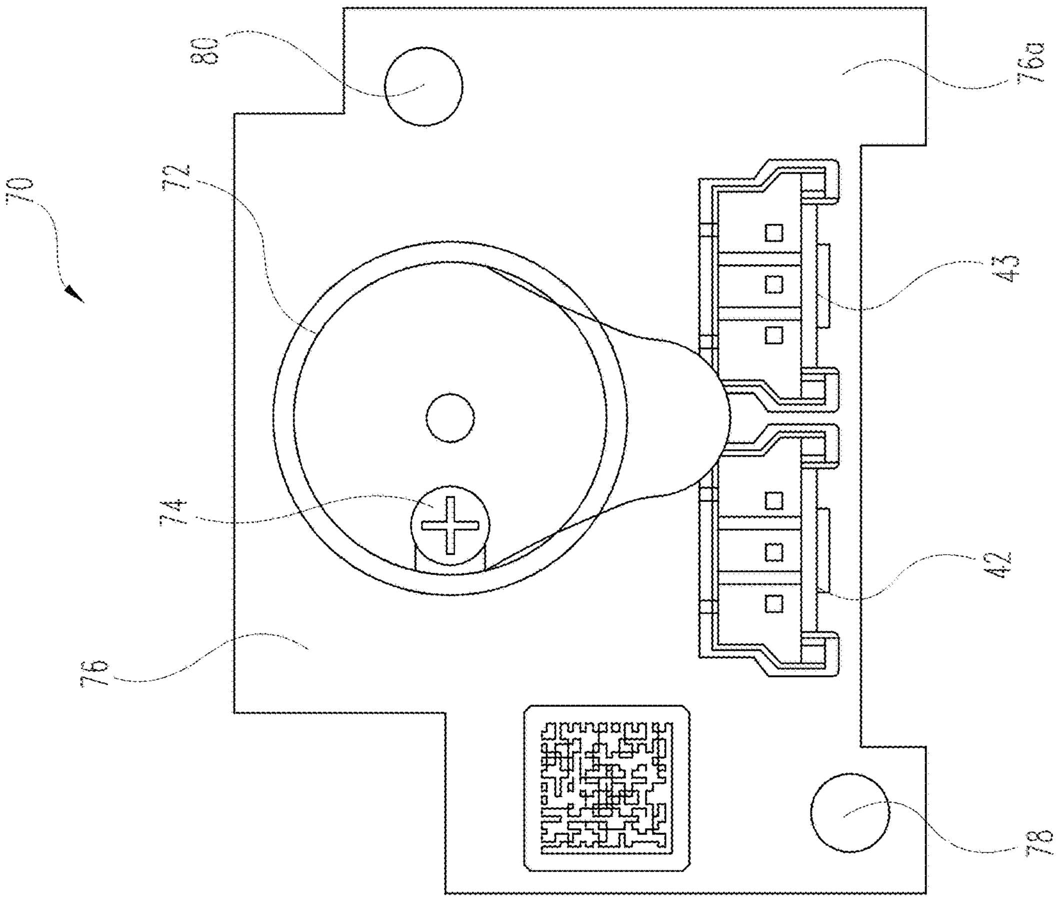
FIG. 9 is a bottom side plan view of the circuit board of FIG. 7.

Referring to FIGS. 7-9, an embodiment of circuit board 70 is shown. Circuit board 70 includes a board 76. Speaker 72 is mounted to an outer side **76*a* of board 76 so that speaker 72 faces away from controller 24. A positive lead indicator 74 may be provided on the outer facing side of speaker 72. In an embodiment, speaker 72** is a 24 volt audio piezo buzzer that operates at 4.8 kHz and 92 dBA. Other embodiments contemplate other types of speakers that operate at different voltages, frequencies, and/or decibels depending on the application and desired output.

Figure 10:
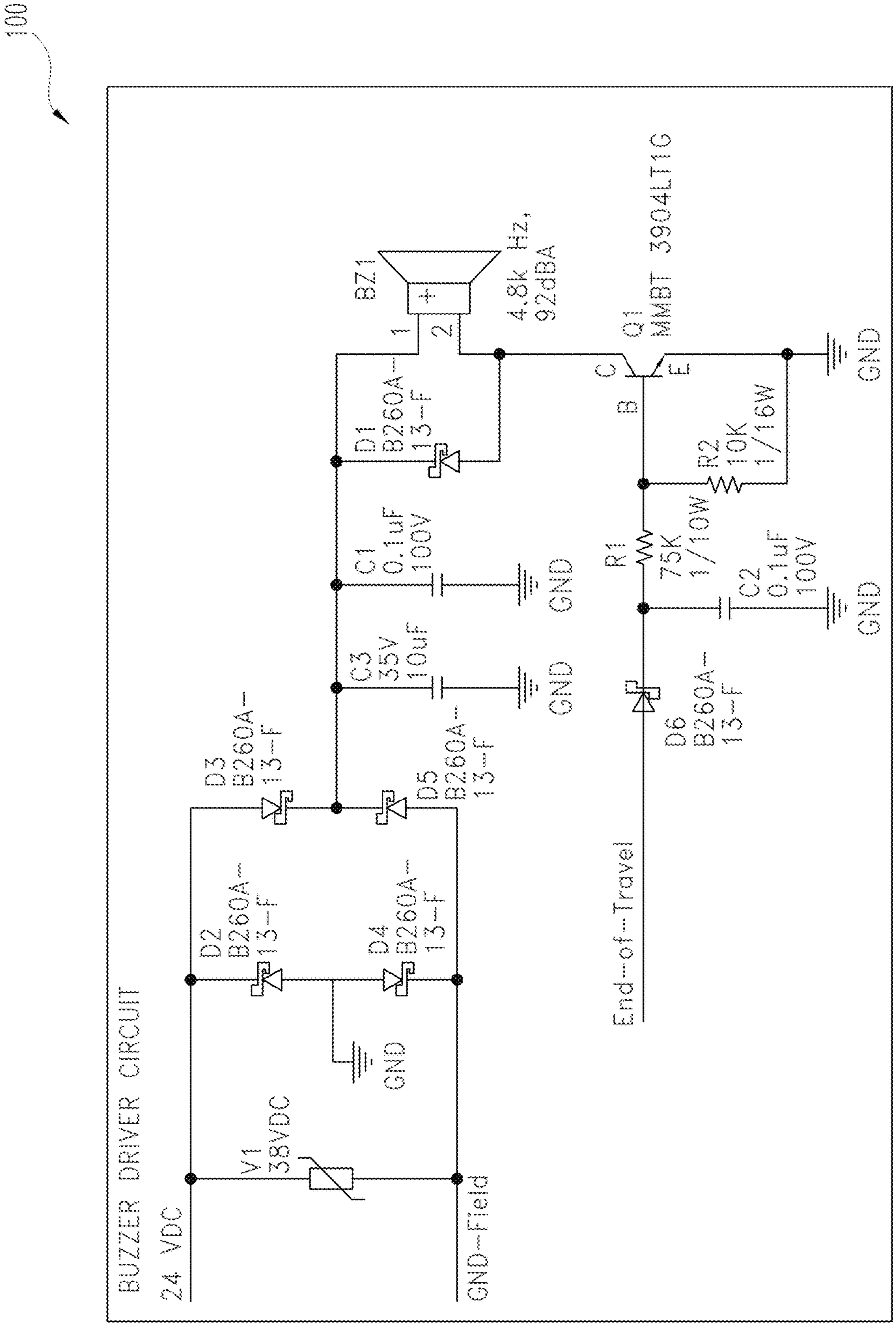
FIG. 10 is an electrical schematic diagram of a driver circuit for the speaker of the audible indicator of FIG. 4 according to certain embodiments.

Board 76 also includes first and second holes 78, 80 to receive respective ones of the first and second fasteners 54, 56 to secure board 76 to first and second legs 48, 50 of housing 44. Holes 78, 80 are located near opposite corners of board 76, and extend from outer side **76*a* to inner side 76*b*. The inner side 76*b* of board 76 includes a number of electronic components that are electrically connected to board 76 to form a driver circuit 100 for speaker 72, such as shown in FIG. 10**.

Figure 11:
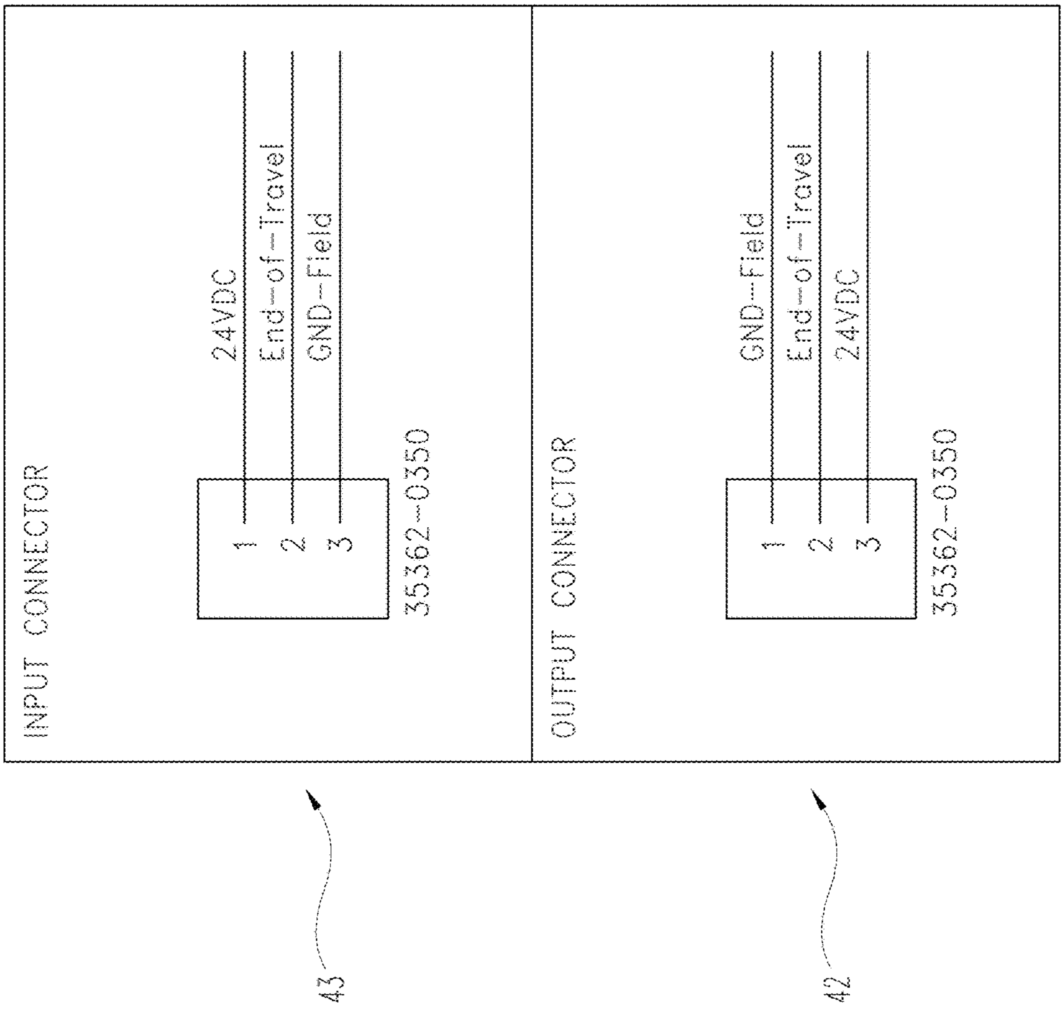
FIG. 11 is an input/output connector schematic diagram of the driver circuit of FIG. 10.

In an embodiment, driver circuit 100 on circuit board 70 includes at least one varistor V1; at least one transistor Q1; at least two resistors R1 and R2; at least three capacitors C1, C2, and C3; and at least six diodes D1, D2, D3, D4, D5, and D6. Board 76 includes conductive traces (not shown) that electrically connect the electronic components to form drive circuit 100. In FIG. 11, schematic diagrams of an embodiment for output connector 42 and input connector 43 are shown.

The driver circuit 100 is configured to initiate an audible output based on activation of motor 22 in response to a signal to unsecure latch 96 and/or operate auto-operator 18. The drive circuit 100 is also configured to continue the audible output until the end of travel for actuator 39, latch 96, and/or door 12 is reached. However, as discussed above, other timing for initiating and/or terminating the audible output in relation to operation of motor 22 are also contemplated.

Various aspects of the present disclosure are contemplated. According to one aspect, an audible indicator for an exit device or an auto-operator of a door is provided. The audible indicator includes a housing including a base, a first leg extending from a first end of the base, and a second leg extending from a second end of the base, the first and second legs and the base forming a U-shaped cavity. The audible indicator also includes a circuit board mounted to the base in the U-shaped cavity. The circuit board includes a first side and an opposite second side. The first side includes a speaker, an input terminal, and an output terminal connected to the circuit board. The second side includes a number of electrical components connected to the circuit board. The number of components are configured to provide a drive circuit to initiate an audible output from the speaker in response to a signal to the exit device or the auto-operator indicating unlatching or opening of the door.

In an embodiment, the base and the first and second legs form a U-shaped lip in the cavity, and the circuit board is positioned on the U-shaped lip.

In a further embodiment, the first leg includes a first fastener bore, the second leg includes a second fastener bore, and the circuit board includes a first hole aligned with the first fastener bore and the circuit board includes a second hole aligned with the second fastener bore. The audible indicator includes a first fastener in the first hole that engages the circuit board to the housing in the first fastener bore, and a second fastener in the second hole that engages the circuit board to the housing in the second fastener bore.

In a further embodiment, the housing includes an outer facing side and the first side of the circuit board is oriented toward the outer facing side. The housing also includes a controller facing side opposite the outer facing side, and the second side of the circuit board is oriented toward the controller facing side. A third fastener bore extends through the housing at a junction of the first leg and the base, and the third fastener bore opens at the outer facing side and the opposite controller facing side. A fourth fastener bore extends through the housing adjacent an outer end of the second leg, and the fourth fastener bore opens at the outer facing side and the opposite controller facing side. The audible indicator also includes a first assembly fastener in the third bore and a second assembly fastener in the third bore. The first and second assembly fasteners are configured to extend through a controller on the controller facing side and engage the housing to a casing of a motor.

In a further embodiment, the housing includes an outer perimeter surface extending along the first and second legs and the base. The outer perimeter surface further extends from the outer side to the controller facing side.

In a further embodiment, the outer perimeter surface includes beveled corners at outer ends of the first and second legs and beveled corners at junctions of the first and second legs with the base.

In a further embodiment, the controller facing side of the first leg includes a cutout. The cutout is configured to receive a protrusion from the controller.

In a further embodiment, an inner side of the second leg faces the cavity, and the inner side of the second leg includes a cutout facing the cavity. The input terminal extends through the cutout toward the outer facing side of the housing.

In an embodiment, the housing includes an outer facing side and the first side of the circuit board is oriented toward the outer facing side. The housing includes a controller facing side opposite the outer facing side, and the second side of the circuit board is oriented toward the controller facing side. The speaker extends from the first side of the circuit board into the cavity of the housing but does not extend past the outer facing side of the housing.

In a further embodiment, an inner side of the second leg faces the cavity, and the inner side of the second leg includes a cutout facing the cavity. The input terminal extends through the cutout toward the outer facing side of the housing.

In an embodiment, the number of components include at least one varistor, at least one transistor, at least two resistors, at least three capacitors, and at least six diodes.

According to another aspect of the disclosure, a motor assembly for an exit device or an auto-operator for a door is provided. The motor assembly includes a motor operably engaged to an actuator that actuates the exit device or the auto-operator, a controller that is configured to initiate operation of the motor in response to an input signal, and an audible indicator including a housing, a circuit board mounted to the housing, and a speaker mounted to the circuit board. The circuit board is electrically connected to input power and to the controller, the housing is fastened to the motor with the controller between the audible indicator and the motor, and the speaker is operable to generate an audible output in response to the input signal initiating operation of the motor.

In an embodiment, the motor assembly includes a plurality of assembly fasteners that extend through the housing of the audible indicator and the controller and are engaged to a casing of the motor.

In an embodiment, the motor assembly includes an electrical connector having a first end connector, a second end connector, and wires extending between the first end connector and the second end connector. The first end connector is electrically engaged to an output terminal of the circuit board and the second end connector is electrically engaged to an input terminal of the controller.

In a further embodiment, the audible indicator includes an input terminal, the input terminal is electrically connected to a power source, and the motor receives power from the power source through the audible indicator.

In an embodiment, the audible output is selectable between a single tone and a series of tones.

In a further embodiment, the audible output is programmed to identify a source of the motor assembly.

In an embodiment, the motor is connected to an actuator, and the actuator is movable to place a latch of the door in an unsecure state.

In an embodiment, the housing of the audible indicator includes a cutout facing the controller, and the controller includes a protrusion that is received in the cutout.

In an embodiment, the housing includes a base, a first leg extending from a first end of the base, and a second leg extending from a second end of the base. The first and second legs and the base forming a U-shaped cavity, and the base and the first and second legs form a U-shaped lip in the cavity. The circuit board is positioned on the U-shaped lip.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An audible indicator for an exit device or an auto-operator of a door, the audible indicator comprising:

a housing including a base, a first leg extending from a first end of the base, and a second leg extending from a second end of the base, the first and second legs and the base forming a U-shaped cavity; and a circuit board mounted to the base in the U-shaped cavity, wherein the base and the first and second legs form a U-shaped lip in the cavity, and the circuit board is positioned on the U-shaped lip, the circuit board including:

a first side and an opposite second side;

wherein the first side includes a speaker, an input terminal, and an output terminal connected to the circuit board; and wherein the second side includes a number of electrical components connected to the circuit board, the number of components configured to provide a drive circuit to initiate an audible output from the speaker in response to a signal to the exit device or the auto-operator indicating unlatching or opening of the door.

2. The audible indicator of claim 1, wherein:

the first leg includes a first fastener bore;

the second leg includes a second fastener bore;

the circuit board includes a first hole aligned with the first fastener bore and the circuit board includes a second hole aligned with the second fastener bore; and further comprising a first fastener in the first hole that engages the circuit board to the housing in the first fastener bore, and a second fastener in the second hole that engages the circuit board to the housing in the second fastener bore.

3. The audible indicator of claim 2, wherein:

the housing includes an outer facing side and the first side of the circuit board is oriented toward the outer facing side;

the housing includes a controller facing side opposite the outer facing side, and wherein the second side of the circuit board is oriented toward the controller facing side;

a third fastener bore extends through the housing at a junction of the first leg and the base, and wherein the third fastener bore opens at the outer facing side and the opposite controller facing side;

a fourth fastener bore extends through the housing adjacent an outer end of the second leg, and wherein the fourth fastener bore opens at the outer facing side and the opposite controller facing side; and further comprising a first assembly fastener in the third bore and a second assembly fastener in the third bore, and wherein the first and second assembly fasteners are configured to extend through a controller on the controller facing side and engage the housing to a casing of a motor.

4. The audible indicator of claim 3, wherein the housing includes an outer perimeter surface extending along the first and second legs and the base, the outer perimeter surface further extending from the outer side to the controller facing side.

5. The audible indicator of claim 4, wherein the outer perimeter surface includes beveled corners at outer ends of the first and second legs and beveled corners at junctions of the first and second legs with the base.

6. The audible indicator of claim 3, wherein the controller facing side of the first leg includes a cutout, the cutout configured to receive a protrusion from the controller.

7. The audible indicator of claim 3, wherein an inner side of the second leg faces the cavity, and the inner side of the second leg includes a cutout facing the cavity, and wherein the input terminal extends through the cutout toward the outer facing side of the housing.

8. The audible indicator of claim 1, wherein:

the housing includes an outer facing side and the first side of the circuit board is oriented toward the outer facing side;

the housing includes a controller facing side opposite the outer facing side, and wherein the second side of the circuit board is oriented toward the controller facing side; and the speaker extends from the first side of the circuit board into the cavity of the housing but does not extend past the outer facing side of the housing.

9. The audible indicator of claim 8, wherein an inner side of the second leg faces the cavity, and the inner side of the second leg includes a cutout facing the cavity, and wherein the input terminal extends through the cutout toward the outer facing side of the housing.

10. The audible indicator of claim 1, wherein the number of components include:

at least one varistor;

at least one transistor;

at least two resistors;

at least three capacitors; and at least six diodes.

11. An audible indicator for an exit device or an auto-operator of a door, the audible indicator comprising:

a housing including a base, a first leg extending from a first end of the base, and a second leg extending from a second end of the base, the first and second legs and the base forming a U-shaped cavity;

a circuit board mounted to the base in the U-shaped cavity, the circuit board including:

a first side and an opposite second side;

the first side including a speaker, an input terminal, and an output terminal connected to the circuit board; and the second side including a number of electrical components connected to the circuit board, the number of components configured to provide a drive circuit to initiate an audible output from the speaker in response to a signal to the exit device or the auto-operator indicating unlatching or opening of the door;

wherein the circuit board is electrically connected to input power and to a controller;

wherein the housing is adapted to be fastened to a motor with the controller between the audible indicator and the motor; and wherein the speaker is operable to generate the audible output in response to the signal that initiates operation of the motor.

12. The audible indicator of claim 11, wherein a plurality of assembly fasteners extend through the housing of the audible indicator and the controller and are engaged to a casing of the motor.

13. The audible indicator of claim 11, wherein the motor is connected to an actuator, and wherein the actuator is movable to place a latch of the door in an unsecure state.

14. An audible indicator for an exit device or an auto-operator of a door, the audible indicator comprising:

a housing including a base, a first leg extending from a first end of the base, and a second leg extending from a second end of the base, the first and second legs and the base forming a U-shaped cavity;

a circuit board mounted to the base in the U-shaped cavity, the circuit board including:

a first side and an opposite second side;

the first side including a speaker, an input terminal, and an output terminal connected to the circuit board; and the second side including a number of electrical components connected to the circuit board, the number of components configured to provide a drive circuit to initiate an audible output from the speaker in response to a signal to the exit device or the auto-operator indicating unlatching or opening of the door; and an electrical connector having a first end connector, a second end connector, and wires extending between the first end connector and the second end connector, wherein the first end connector is electrically engaged to the output terminal of the circuit board and the second end connector is electrically engaged to an input terminal of a controller.

15. The audible indicator of claim 11, wherein:

the input terminal of the circuit board is electrically connected to the input power; and the motor receives power from the input power through the audible indicator.

16. An audible indicator for an exit device or an auto-operator of a door, the audible indicator comprising:

a housing including a base, a first leg extending from a first end of the base, and a second leg extending from a second end of the base, the first and second legs and the base forming a U-shaped cavity; and a circuit board mounted to the base in the U-shaped cavity, the circuit board including:

a first side and an opposite second side;

wherein the first side incudes a speaker, an input terminal, and an output terminal connected to the circuit board; and wherein the second side incudes a number of electrical components connected to the circuit board, the number of components configured to provide a drive circuit to initiate an audible output from the speaker in response to a signal to the exit device or the auto-operator indicating unlatching or opening of the door, and wherein the audible output is selectable between a single tone and a series of tones.

17. The audible indicator of claim 16, wherein the audible output is programmed to identify a source of a motor assembly of the exit device or the auto-operator.

18. The audible indicator of claim 16, wherein the base and the first and second legs form a U-shaped lip in the cavity, and the circuit board is positioned on the U-shaped lip.

19. The audible indicator of claim 16, wherein the circuit board is electrically connected to input power and to the controller;

wherein the housing is adapted to be fastened to a motor with the controller between the audible indicator and the motor; and wherein the speaker is operable to generate the audible output in response to the signal that initiates operation of the motor.

20. An audible indicator for an exit device or an auto-operator of a door, the audible indicator comprising:

a housing including a base, a first leg extending from a first end of the base, and a second leg extending from a second end of the base, the first and second legs and the base forming a U-shaped cavity;

a circuit board mounted to the base in the U-shaped cavity, the circuit board including:

a first side and an opposite second side;

wherein the first side includes a speaker, an input terminal, and an output terminal connected to the circuit board; and wherein the second side includes a number of electrical components connected to the circuit board, wherein the number of components is configured to provide a drive circuit to initiate an audible output from the speaker in response to a signal to the exit device or the auto-operator indicating unlatching or opening of the door, wherein the housing of the audible indicator includes a cutout facing a controller, and wherein the controller includes a protrusion that is received in the cutout.

* * * * *